US012755500B1

(12) United States Patent
Monsarrat

(10) Patent No.: US 12,755,500 B1
(45) Date of Patent: Oct. 6, 2026

(54) MULTIUSER SYNCHRONIZATION OF REAL AND VIRTUAL WORLDS

(71) Applicant: Monsarrat, Inc., Swansea, MA (US)

(72) Inventor: Jonathan Monsarrat, Swansea, MA (US)

(73) Assignee: Monsarrat, Inc., Hyde Park, MA (US)

( * ) Notice: Subject to any disclaimer, the term of this patent is extended or adjusted under 35 U.S.C. 154(b) by 0 days.

(21) Appl. No.: 19/541,971

(22) Filed: Feb. 17, 2026

(51) Int. Cl.
*G06T 19/00* (2011.01)
*H04W 4/02* (2018.01)

(52) U.S. Cl.
CPC .......... *G06T 19/006* (2013.01); *H04W 4/023* (2013.01)

(58) Field of Classification Search
CPC ............................ G06T 19/006; H04W 4/023
See application file for complete search history.

(56) References Cited

U.S. PATENT DOCUMENTS

| | | | | |
|---|---|---|---|---|
| 11,112,250 B1 | 9/2021 | Monsarrat | | |
| 11,430,187 B1 | 8/2022 | Monsarrat | | |
| 12,361,655 B1 | 7/2025 | Monsarrat | | |
| 2019/0242989 A1* | 8/2019 | Lee | H04W 4/029 |
| 2020/0099891 A1* | 3/2020 | Valli | H04L 65/403 |
| 2024/0393422 A1* | 11/2024 | Koshy | A63F 13/332 |
| 2025/0023876 A1* | 1/2025 | Shalowitz | G06T 19/20 |

OTHER PUBLICATIONS

Meta Developers, "Understanding Spatial Anchors", Dec. 22, 2025, Published on YouTube, https://www.youtube.com/watch?v=WxtmZLi7i2g&t=3s (Year: 2025).*

XR Dev Rob—XR AI Tutorials, "Colocation with Meta's Shared Spatial Anchors & the new Colocation Discovery API", Jan. 21, 2025, Published on YouTube, https://www.youtube.com/watch?v=elf6WuGzwdl (Year: 2025).*

* cited by examiner

*Primary Examiner* — Kee M Tung
*Assistant Examiner* — Thang Gia Huynh
(74) *Attorney, Agent, or Firm* — David J. Thibodeau; VLP Law Group LLP

(57) ABSTRACT

As part of a location-based experience, multiple users share a virtual world whose frame of reference is correlated to a real world position and orientation. Each user begins real-time tracking of their relative movements, and takes relative angle and distance measurements to other users with detection devices without relying on an absolute positioning system. This forms a graph of real-world user alignments that can be mirrored to place each user viewpoint in the virtual world, such that every real and virtual user interaction seem aligned. Then, physical user movement continues to be tracked, updating virtual user viewpoints. Users may have separate virtual world correlations into the real world. Should those correlations become unaligned, they can be realigned, either smoothly or abruptly, and sometimes with users needing to physically relocate.

15 Claims, 8 Drawing Sheets

Relative Position During Measurement

A User with a Device

Are Correlated Along Some User View Vector

A Real Space and a Virtual Space

The User Walks a Path in the Real Space

That Navigates the Virtual Space

Two Users in a Real Space

Are Correlated to Viewpoints in a Virtual Space

Two Users Calculating Their Relative Alignment

Triangulation

Works for Any Alignment

Perspective Views

Scanning Close Up

Scanning at a Distance

The Relative Alignment is Applied to the Virtual Viewpoints

Relative Position During Measurement

Relative Position After Measurement

Real World Alignment

Virtual World Alignment

Each User Has A Virtual World Correlation

Each User Has a Separate Virtual World Correlation to the Real World

One User's Correlation Shifts to a New Placement

The Wayward Correlation is Healed Back to Its Original Placement

Correlated Virtual and Real Spaces for Three Users

The Correlation Moves, Placing the Virtual World Elsewhere

All Users Physically Relocate to Match the New Virtual World Placement

System to Measure, Track, and Correct the Alignments Between Multiple Users in Real and Virtual Worlds

MULTIUSER SYNCHRONIZATION OF REAL AND VIRTUAL WORLDS

TECHNICAL FIELD

This patent application relates to virtual experiences with multiple users, where a virtual world is correlated with a real-world position and orientation, such that each user's physical location and virtual avatar location are synchronized, even when users move in the physical world. More particularly, this patent application relates to a Location-Based Experience (LBE) where multiple users move virtual avatars through a simulated virtual world simply by walking in the same direction through the real world.

BACKGROUND

In some Location-Based Experiences, a virtual world gets correlated to a real-world space, and users walk around physically to move their viewpoint through the virtual world, often accompanied by a virtual avatar of the user. This provides users an immersive feeling that's lacking in desktop applications where users simply sit. Users find this type of experience exciting, because their real-world sense of movement and proprioception is applied to the virtual world, and because a user's body chemistry changes as they move physically.

As one example, see U.S. Pat. No. 11,112,250B1 entitled "System for automatic instantiation of a generically described location-based traveling experience to specific map coordinates and real-time conditions" assigned to Monsarrat, Inc., the assignee of the present application, the entire contents of which are hereby incorporated by reference.

In that patent, a user's position and orientation in the real world is tracked by a device such as a mobile phone or Augmented Reality (AR) headset. A simulation system maintains a correlation vector that maps a virtual world space onto a real-world space. The resulting Location Based Travel Experience (LBTE) is such that when the user walks in the real world, the mobile device senses this and the correlation vector is applied to move the user's avatar in the virtual world.

Such an experience has an additional benefit with multiple users who begin the experience nearby, sharing one physical space: social dynamics. To face each other in the virtual world, two users face each other in the physical world. They can gesture and speak with each other in the real world. If they want to chase each other in the virtual world, they follow each other in the real world.

Also, in some systems the single, shared virtual world that all the users explore is correlated into the real world separately for each user. These correlations may initially begin the same, with all user correlations aligned, but then become unsynchronized over time. When one user's virtual world moves its real-world correlation, all of the other users' physical positions no longer match their virtual avatar positions.

As one example, see U.S. Pat. No. 11,430,187 entitled "Enforcing virtual obstacles in a location-based experience" assigned to Monsarrat, Inc., the assignee of the present application, the entire contents of which are hereby incorporated by reference. In this invention, the correlation of the virtual world into the real world can change:

- to prevent a real-world user movement causing their game world avatar to walk through a virtual wall, or
- to move the virtual world to a more convenient real-world correlation, if the real world has barriers to movement such as a park bench.

As another example, see U.S. Pat. No. 12,361,655B1 entitled "Handling invalid user control motions in augmented reality" assigned to Monsarrat, Inc., the assignee of the present application, the entire contents of which are hereby incorporated by reference. In this invention, the correlation of the virtual world into the real world can change to penalize a user for running too fast, limiting the user's virtual world progress, similar to how running on a treadmill gets you nowhere.

SUMMARY OF PREFERRED EMBODIMENTS

Such a Location-Based Experience would previously be built with the unfortunate limitation that the users' absolute physical position must be known, at least initially, for example through GPS or local signaling beacons. But setting up signaling beacons is impractical in most locations, and GPS locations are not precise, and can have large temporary glitches. Additionally, some adult users, or child users with concerned parents, wish to avoid disclosing their real-world location.

A new type of Location-Based Experience does not require the users' absolute locations to be known, even if each user has a separate virtual world correlation into the real world that can change.

First, multiple users meet in a real-world space and set up a virtual space that is correlated to the real world. Then, the orientation and position of all users relative to each other must be calculated. For example, if a first user's avatar in the virtual world turns in a 120° angle and throws a virtual frisbee towards a second user's avatar 10 m away, the first real-world user should also turn physically in a 120° angle and see the second real-world user physically 10 m away.

To accomplish this, one user's location is assigned as the master location, and instead of needing an absolute position of other users, other users are placed relative to that master location through the use of some sensing technology, such a first user displaying an AR anchor on a phone and the second user scanning it. Users scan each other in some chain of relative positions that ultimately link every user's relative position.

From that starting alignment, future virtual positions of all users are calculated by a relative movement sensor that can track each user's relative real-world movements. For example, users walk through a real-world space while an augmented reality algorithm uses a mobile phone's camera tracks their relative movement.

Then, if the users' relative positions become misaligned, through accumulative flaws in the relative movement sensor, or because the correlation of the virtual space into the real-world space changes, either for all users, or for each user individually, either:

- the users can reset themselves by taking fresh relative measurements between each other, which might be followed by the virtual world correlation(s) into the real world having to be aligned, and the users needing to change their physical location, or
- through temporarily accepting the error, but "healing" the differing virtual spaces back towards alignment as the users move through the space.

DETAILED DESCRIPTION OF PREFERRED EMBODIMENTS

A description of preferred embodiments follows.

Correlating a Virtual World with the Real World

FIGS. 1A to 1E show how a virtual world can be placed into the real world and navigated. The embodiments described herein assume the existence of a technology that provides virtual Location-Based Experiences (LBEs). One example of such a technology was described in the aforementioned U.S. Pat. No. 11,430,187.

A User 101 has no absolute positioning system such as GPS or proximity beacons. Instead the user tracks his or her relative changes in position (X, Y, Z), and orientation (yaw, pitch, and roll), through a method such as Mobile Device 102 that uses a combination of accelerometer motion sensing and visual sensing of the user's environment.

Figure 1A:
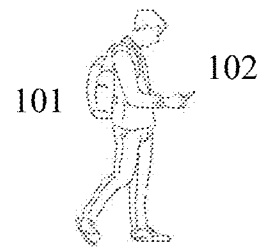
FIGS. 1A, 1B, 1C, 1D and 1E show how a virtual world can be placed into the real world and navigated.
Figure 1C:
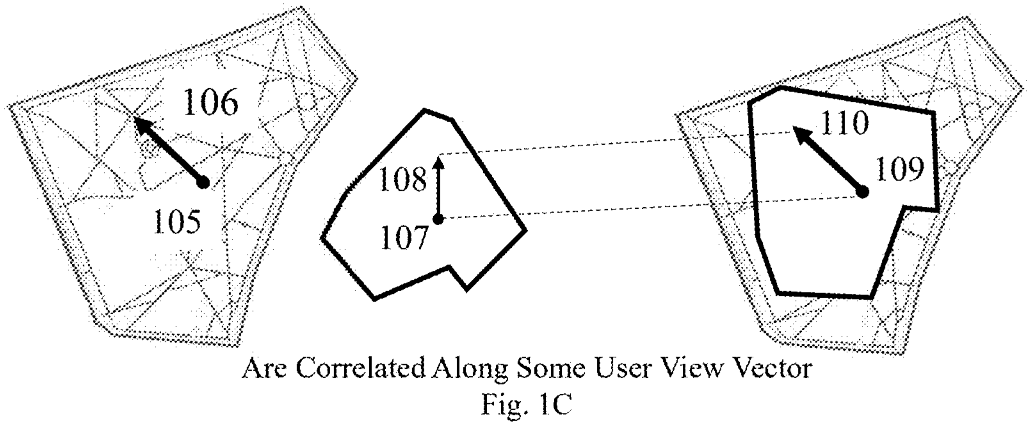
Figure 1B:
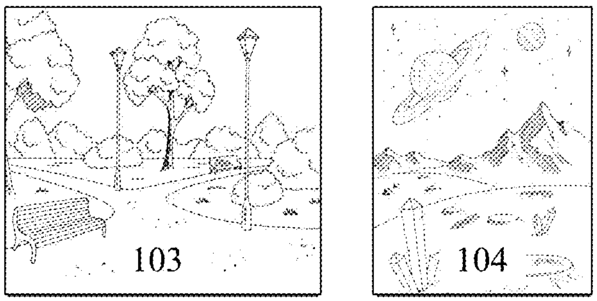
Figure 1D:
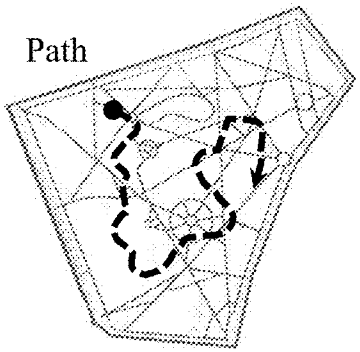
Figure 1E:
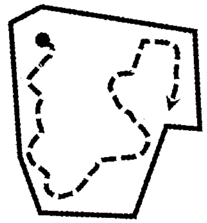

The User 101 walks through a Real-World Space 103 and also wants to explore a Virtual World 104. As in FIG. 1C, when the user walks from 105 to 106 in the real world, the LBE system moves the user's virtual world viewpoint, which could be matched with a virtual avatar, from 107 to 108. This can be made to feel realistic and immersive by correlating the virtual space with the real world, so that when the user moves, as in FIG. 1C, from 109 to 110 in the real world, there is a corresponding move from 109 to 110 in the virtual world. Any path that the user walks, as in FIG. 1D, is used by the system to calculate a navigation path, as in FIG. 1E, through the virtual world.

Correlating Two Users

Figure 2A:
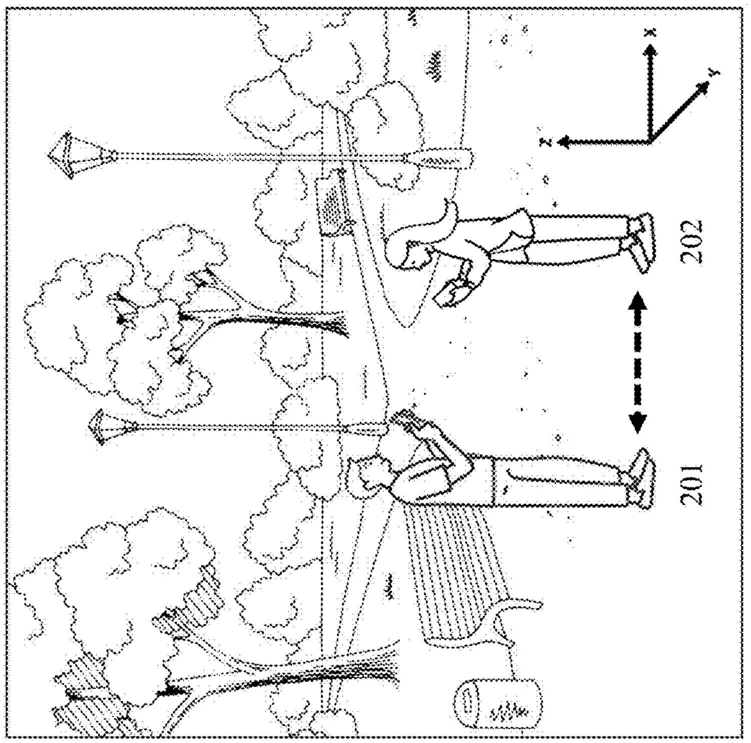
FIGS. 2A and 2B show how two users can interact with each other when a real-world space and virtual space are correlated.
Figure 2B:
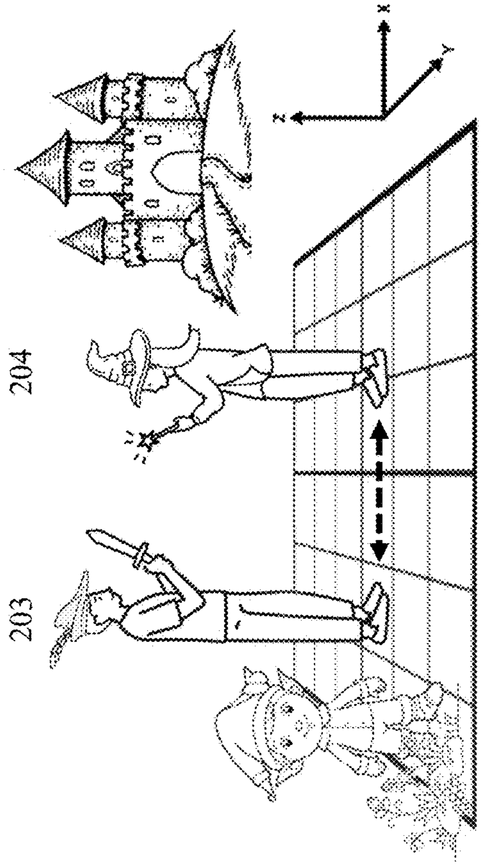

FIGS. 2A to 2B show how multiple users can interact with each other when a real-world space and virtual space are correlated.

In FIG. 2A, a First User 201 and a Second User 202 meet together in a real-world park. They face each other at a distance of 2 meters. In FIG. 2B, the users have viewpoints into the virtual world, here embodied by First User Avatar 203 and Second User Avatar 204, which also face each other, and also stand apart at a distance of 2 meters. Of course, depending on the rules of the Location-Based Experience, the relative alignment of the users in the real world need not be perfectly replicated in the virtual world. For example, if the user avatars in the virtual world are giants, users could expect a real-world measurement of one normal-body-length between 2 people to be represented by one giant-body-length separation in the virtual world.

When the First User 201 moves in the real world, he expects the First User Virtual Viewpoint 203, his viewpoint in the virtual world, and in this case also his virtual avatar, to follow those movements. Since the Second User Avatar 204 is part of the virtual world, as the First User Virtual Viewpoint 203 moves around, First User 201 naturally expects to see Second User Avatar 204 in her correct position in the virtual world, from any angle and distance. If the Second User 202 moves in the real world, the position and orientation of the Second User Avatar 204 follows her movements, and the First User 201, looking into the virtual world through the First User Viewpoint 203, would see the Second User Avatar's position and orientation change in the virtual world.

This gives both users an immersive and social feeling, and creates a natural interface. When the users in the real world confront each other, hide from each other, walk together, look at each other from a distance, or follow each other in the real world, their virtual avatars make similar movements.

The same would of course also apply for more than two users.

Measuring a Relative Alignment in Real and Virtual Spaces

FIGS. 3A to 3G show users calculating their relative position and orientation.

Figure 3A:
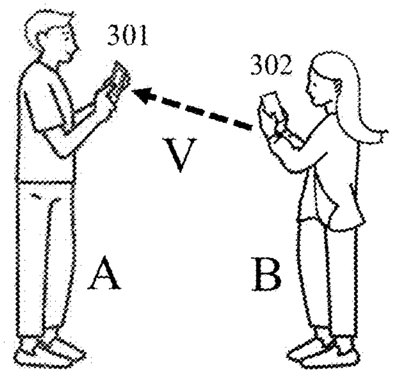
FIGS. 3A, 3B, 3C, 3D, 3E, 3F and 3G show users calculating their relative position and orientation.
Figure 3G:
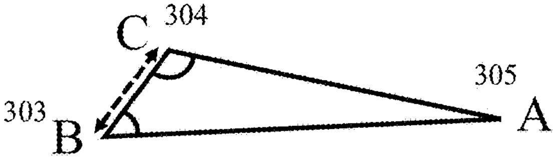
Figure 3E:
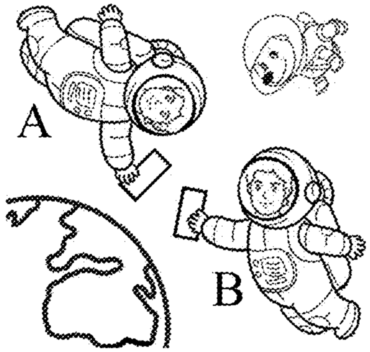

In FIG. 3A, in the real world, User B wants to calculate her relative vector to User A. User A has a Detectable Feature 301, which User B can measure using a Detection Device 302. For example, User B uses a mobile phone camera to scan a QR code on User A's phone.

Figure 3B:
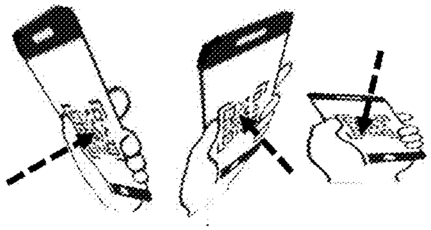
Figure 3C:
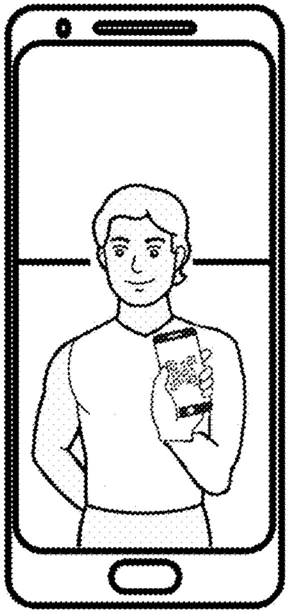

In FIG. 3C, for close-up applications, when User A stands close to User B, the Detectable Feature on User A could be, but is not limited to, a mobile phone displaying a QR code or AR anchor, which would be easily seen on User B's phone camera.

Then, as in FIG. 3B, the perspective angle and size of User A's Detectable Feature 301 as it appears visually on User B's phone camera 302 gives a precise relative position and orientation between User A and User B, as is well-known in previous inventions relating to AR anchors.

Figure 3D:
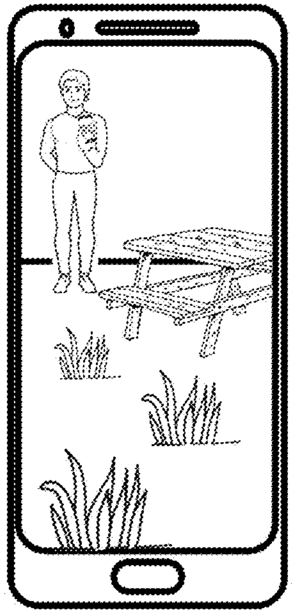

In FIG. 3D, for longer-distance applications, User A is too far from User B for the Detectible Feature to be a QR code. User B's Detection Device can't see it at that distance. So we either:

1. Solve it with a Detectible Feature on User A that is detectible at a long distance, which could be, but is not limited to, as in FIG. 3D:
   - something visible at a distance from User B's phone camera:
     - User A's face, body, or clothing
     - a large recognizable item or pattern that User A holds or wears,
     - User A's phone blinking a color or flashlight that stands out visually from the background
   - Or an electronic device, for example a positioning beacon or a mobile phone with Bluetooth direction finding.
2. Or solve it, as in FIG. 3G, with math requiring no long-distance detections:
   - Way 1. Three Users, A, B, and C.
     - All users have a relative motion sensor operating,
     - User B at 303 and User A at 305 face each other, giving their relative orientation, without needing either user to have a Detection Device or any Detectible Features,
     - User B at 303 turns towards User C at 304. User B's relative motion sensor detects the angle of the turn.
     - User A and User B are close enough that a Detection Device with User B can measure the distance to a Detectible Feature on User A.

Two angles and one side define a triangle and thus a relative placement of all users, even though User A is far away.

Way 2. Two Users. Users A and B only. User C does not exist.

All users have a relative motion sensor operating,

User B at 303 and User A at 305 face each other, giving their relative orientation, without needing either user to have a Detection Device or any Detectible Features, User B at 303 moves to a new location, 304 and then faces User A again. User B's relative motion sensor detects the distance and angle of the turn.

Two angles and one side define a triangle and thus a relative placement of all users, even though User A is far away.

Other combinations with multiple users, some too far away, would of course also be possible. In a Location-Based Experience where users are walking and interacting with each other, there would be many opportunities for measurements and recalibrations.

The technique still works if User A and B do not stand vertically upright, and it still works if they are not placed at the same physical height. As in FIG. 3E, if they were astronauts in orbit, perhaps with a space dog companion, they could have any alignment relative to each other.

Now the system has measured the relative real-world alignment of User B's Detection Device 302 and User A's Detectable Feature 301, including position and orientation. Some additional adjustment may be necessary if:

User B's viewpoint into the virtual world is not aligned with User B's Detection Device 302, or User A's viewpoint into the virtual world is not aligned with User A's Detection Device 302.

Figure 3F:
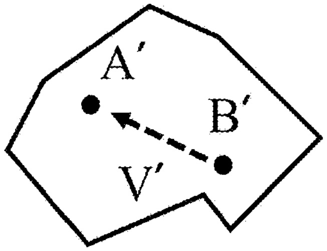

As in FIG. 3F, now that the relative position and orientation alignment of Users A and B is known, this can be applied to create a Virtual World Alignment V' between User A's Virtual Viewpoint A' and User B's Virtual Viewpoint B'.

Maintaining Relative Alignment After Measurement

Figure 4A:
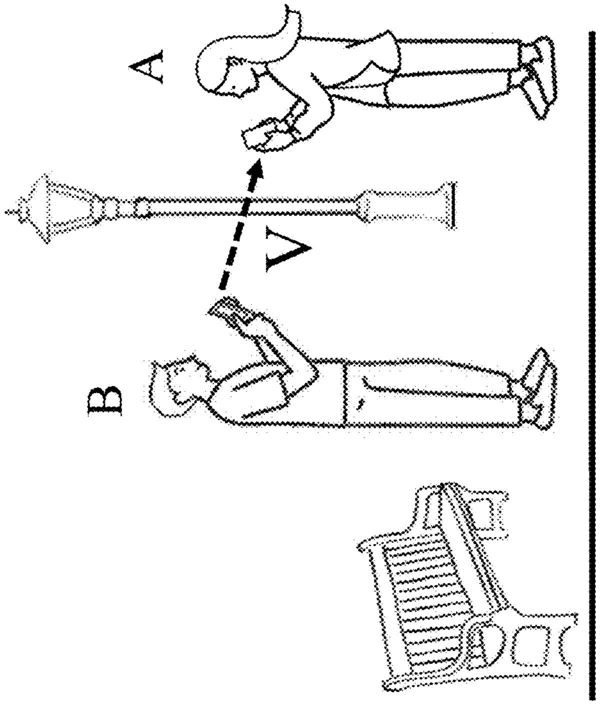
FIGS. 4A and 4B show a measured relative alignment can be maintained afterwards.
Figure 4B:
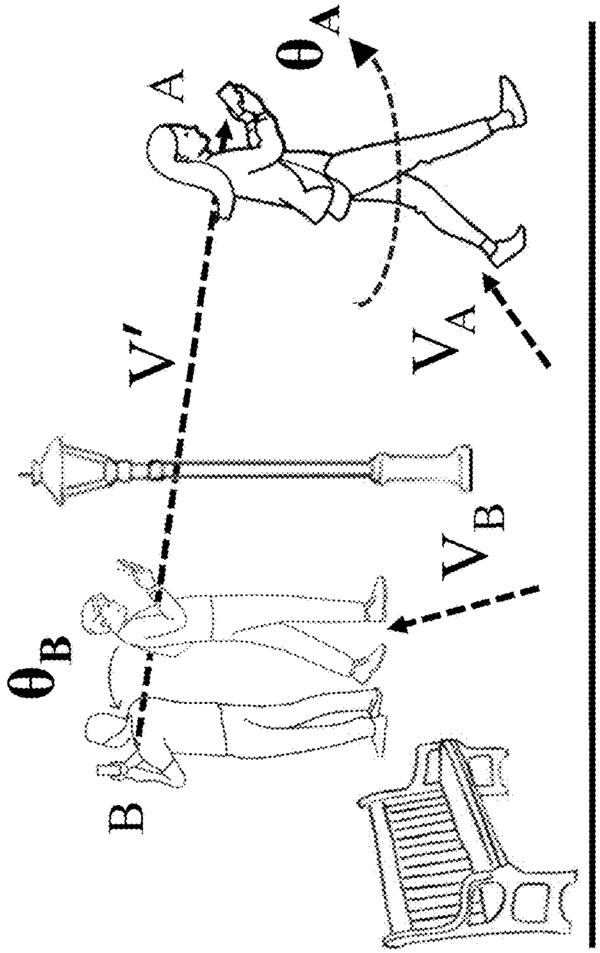

FIGS. 4A to 4B show a measured relative alignment can be maintained afterwards.

Once the users' relative positions and orientations in the real world have been calculated, and the users' viewpoints or avatars have been placed at a similar alignment into the virtual world, those relative alignments in the real world must be tracked and maintained during the entire Location-Based Experience.

In FIG. 4A, User B measures V, a relative real-world alignment to User A that includes position and orientation Then, as in FIG. 4B, the users move in the real world as part of the Location-Based Experience:

User A moves through vector $V_A$ and orientation $\theta_A$

User B moves through vector $V_B$ and orientation $\theta_B$

The relative movement of each user is tracked by some method, which could include, but is not limited to, a mobile phone with visual tracking of real-world features, or dead reckoning tracking with an accelerometer. Those movement vectors are then used to modify the position and orientation of each user's virtual viewpoint, and possibly user avatar, in the virtual world.

Also as in FIG. 4B, directly combining the previously measured alignment V with each user's subsequent relative movement vectors will give a new relative alignment V' between User A and User B.

Correlating Many Users

Figure 5A:
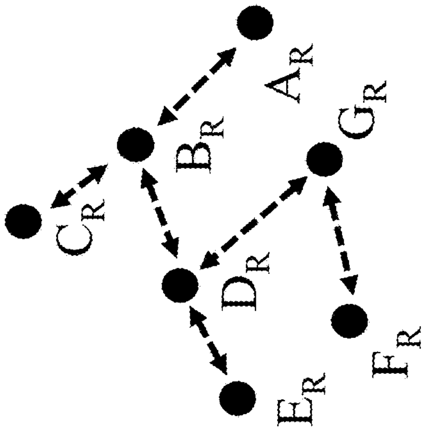
FIGS. 5A, 5B and 5C show aligning more than two users in real and virtual worlds.
Figure 5B:
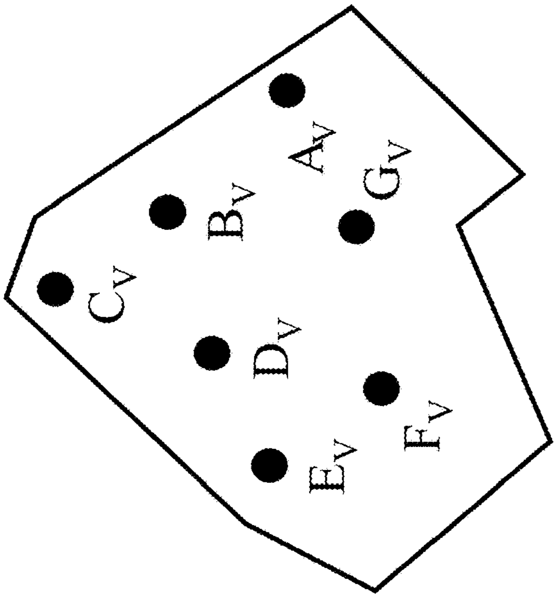
Figure 5C:
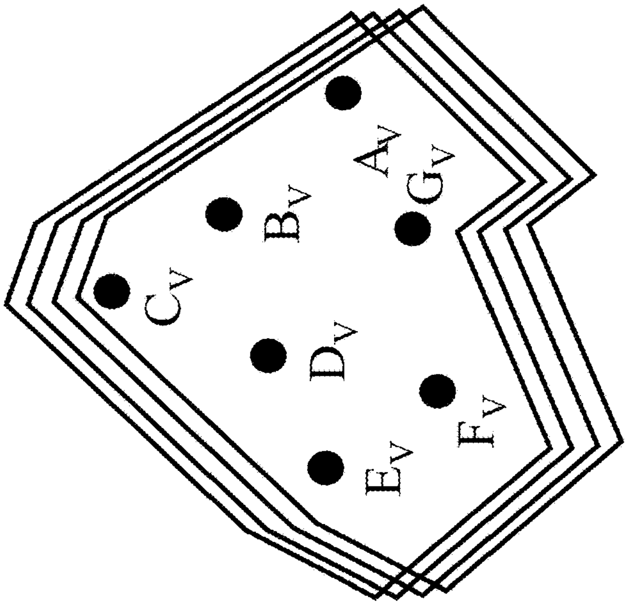

FIGS. 5A to 5C show aligning more than two users in real and virtual worlds.

In FIG. 5A, many users get relatively aligned with each other through detecting each other's detectable features. User A does not need to detect a relative alignment with every other user. It is sufficient for each user to align with one other user, as long as those alignments form a completely linked graph. Then the pairs of relative alignments can be combined to form an overall relative alignment of everyone.

These alignments $A_R$ to $G_R$, as in FIG. 5A, can then be used, as in FIG. 5B, to calculate each user's virtual world viewpoint, and possibly an avatar, at $A_V$ to $G_V$. The virtual world in FIG. 5B can have any rotation or placement into the real world; it is the relative user alignments in that virtual world that matter.

As in FIG. 5C, each user may have their own, separate correlation between the one shared virtual world and the one shared real world space. That would, for example, allow, as in the aforementioned U.S. Pat. No. 11,430,187, each user's correlation to shift when the user encounters a real-world or virtual world obstacle to movement.

Healing Correlations Back Together Slowly and Smoothly

Figure 6A:
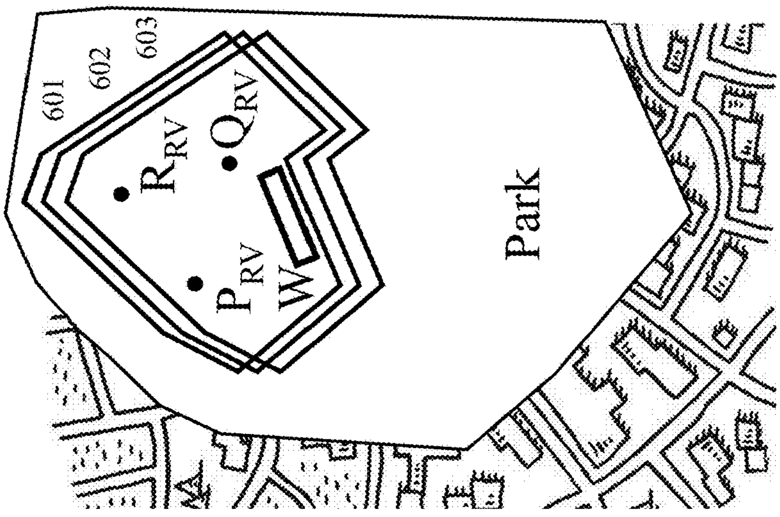
FIGS. 6A, 6B and 6C show different users' virtual world correlations being corrected.
Figure 6B:
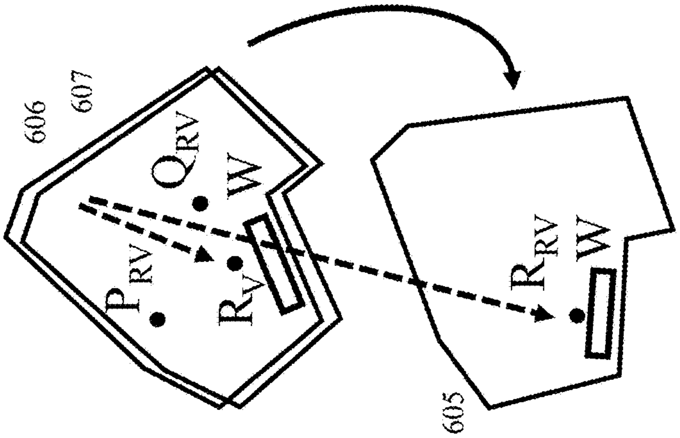
Figure 6C:
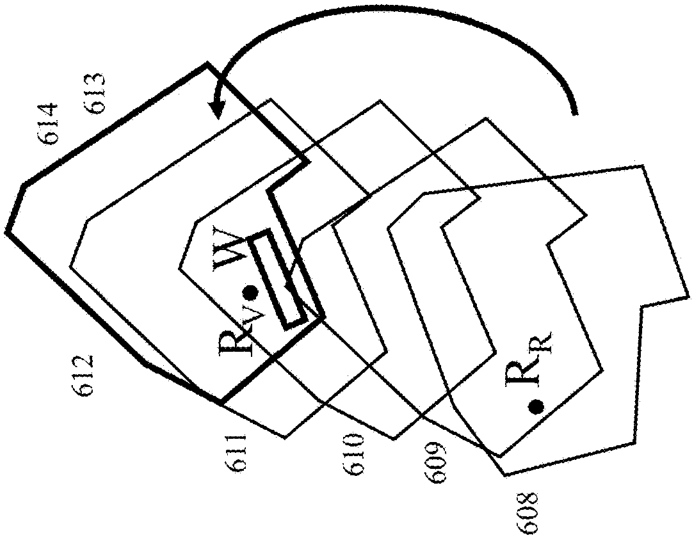

FIGS. 6A to 6C show different users' virtual world correlations being corrected.

FIG. 6A is a top-down city map with a large park, where three users each have their own correlations of the virtual world to the real world, 601, 602, and 603, which are the same. (In the diagram, they are drawn slightly apart just so that all three correlations are visible.) So effectively, User P stands in the "same place" $P_{RV}$ in the real and virtual worlds. User Q stands at $Q_{RV}$, and User R stands at $R_{RV}$. Other correlations are possible, but this is the most commonly desired, because it aligns the users' physical and virtual interactions and makes the virtual world feel more real.

This virtual world happens to contain a virtual wall, W.

Correlation errors between the virtual and real worlds can happen for a variety of reasons, including but not limited to a drift in the relative movement tracking of each user. But in this case, in FIG. 6B, through some mechanism such as in the aforementioned U.S. Pat. No. 11,430,187, User R tries to walk through the wall, W, which is disallowed. As User R continues to move ahead in the real world, User R's correlation 605 of the virtual world into the real world is pushed away, to prevent User R's virtual avatar from passing through the wall, W. As User R moves to point $R_{RV}$, this trick of moving the virtual world correlation keeps User R in the "same place" in the virtual and physical worlds.

The reason for the error doesn't matter. For whatever reason, User R's correlation of the virtual space is now different from User P's and User Q's correlations. This is unacceptable, because R has to mind his Ps and Qs. In the correlations 606 and 607 for User P and User Q, User R's virtual location is mismatched with User R's physical location. When User P looks towards User R's virtual avatar, User P does not see User R in that place in the real world. User R is in some other position.

As in FIG. 6C, this problem can be solved by moving User R's correlation 608 through a series of small movements, such as to 609, 610, 611, and finally back to 612, matching the correlations 613 of User P and 614 of User Q.

Such a movement of User R's correlation 608 could be abrupt, but it could also be subtle. When User R is standing still, small movements of the virtual space are very noticeable. But when User R is moving, it is similar to when you try to walk in a straight line in a forest but can't. People don't notice slight changes as they walk. The virtual world can slowly shift "underneath" User R's motions without being perceived.

The benefit to this approach is that the Location-Based Experience never needs to halt, and User R never notices any difference between his or her virtual and real-world positions $R_{RV}$. Notice in FIGS. 6B and 6C that User R stays next to Wall W the entire time, in the virtual world. The minor limitation is that Users P and Q continue to see User R out of alignment for however long it takes to heal User R's correlation 608 back to 612.

Forcing Correlations Back Together Quickly

Figure 7A:
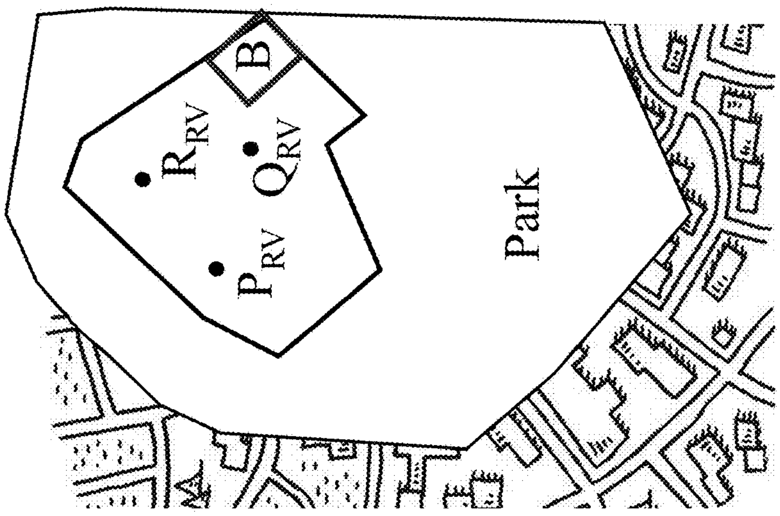
FIGS. 7A, 7B and 7C show a second way to correct a virtual and real-world correlation error.
Figure 7B:
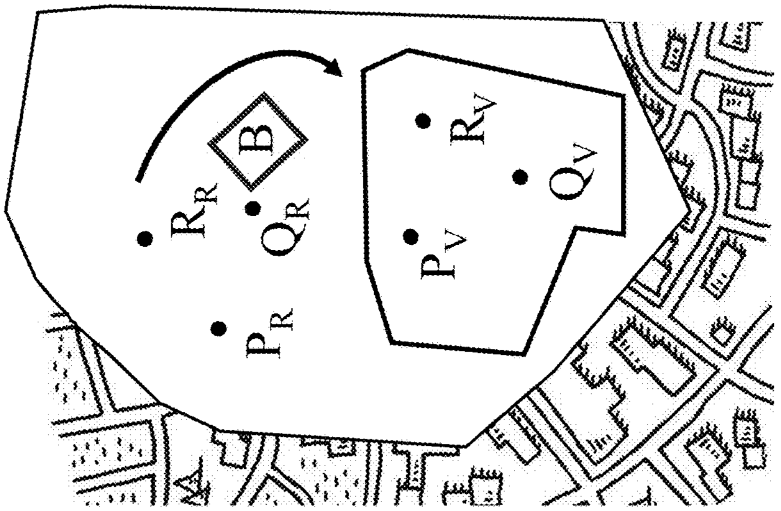
Figure 7C:
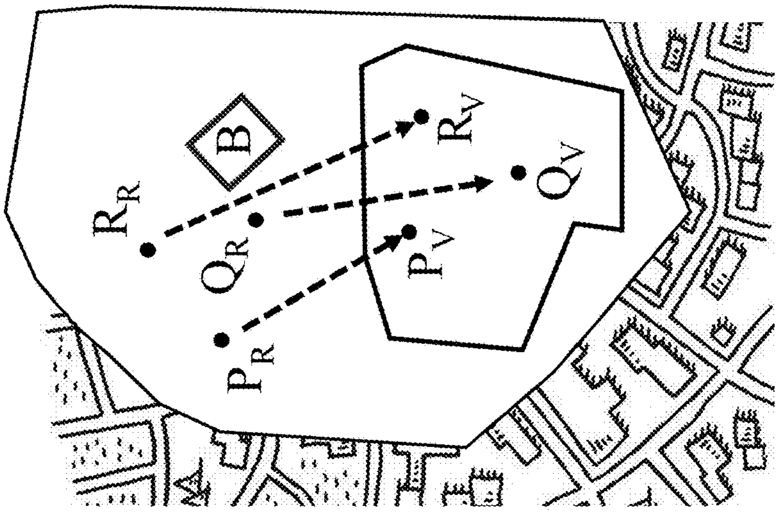

FIGS. 7A to 7C show a second way to correct a virtual and real-world correlation error.

FIG. 7A is another top-down city map with a large park, where the real-world space and virtual space are correlated. Thus, Users P, Q, and R are, separately, each at "the same place" (properly correlated) in the real and virtual worlds. They can see and interact with each other in similar ways in both real and virtual spaces.

Then, in FIG. 7B, the virtual space for all 3 users moves, either by a drift in the tracking of relative user motions, or through user choice or some limitation of the Location-Based Experience, for example from the aforementioned U.S. Pat. No. 11,430,187.

In FIG. 7C, the system does not want to smoothly "heal" the correlation of the virtual world back to its original place. For example, perhaps there was a real-world building B that prevented the users from walking through the entire virtual world, so the change in correlation in FIG. 7B was not an error. We do not wish to return the correlation to its original location. In this case, new real world positions $P_V$, $R_V$, and $Q_V$ are calculated for every user, based on:

their virtual viewpoint position in the virtual world the virtual world's correlation into the real world Then each user is required to relocate to new physical locations that correlate with their avatars in the relocated virtual space. User P moves from $P_R$ to $P_V$, at which point $P_V$ and $P_R$ are of course "the same" (properly correlated). Users Q and R also relocate. Then the physical and virtual positions of all users are also properly correlated again. For however long it takes the users to physically relocate, the Location-Based Experience could either be paused and restarted, or just continue.

Entire System to Measure and Track User Alignments

Figure 8:
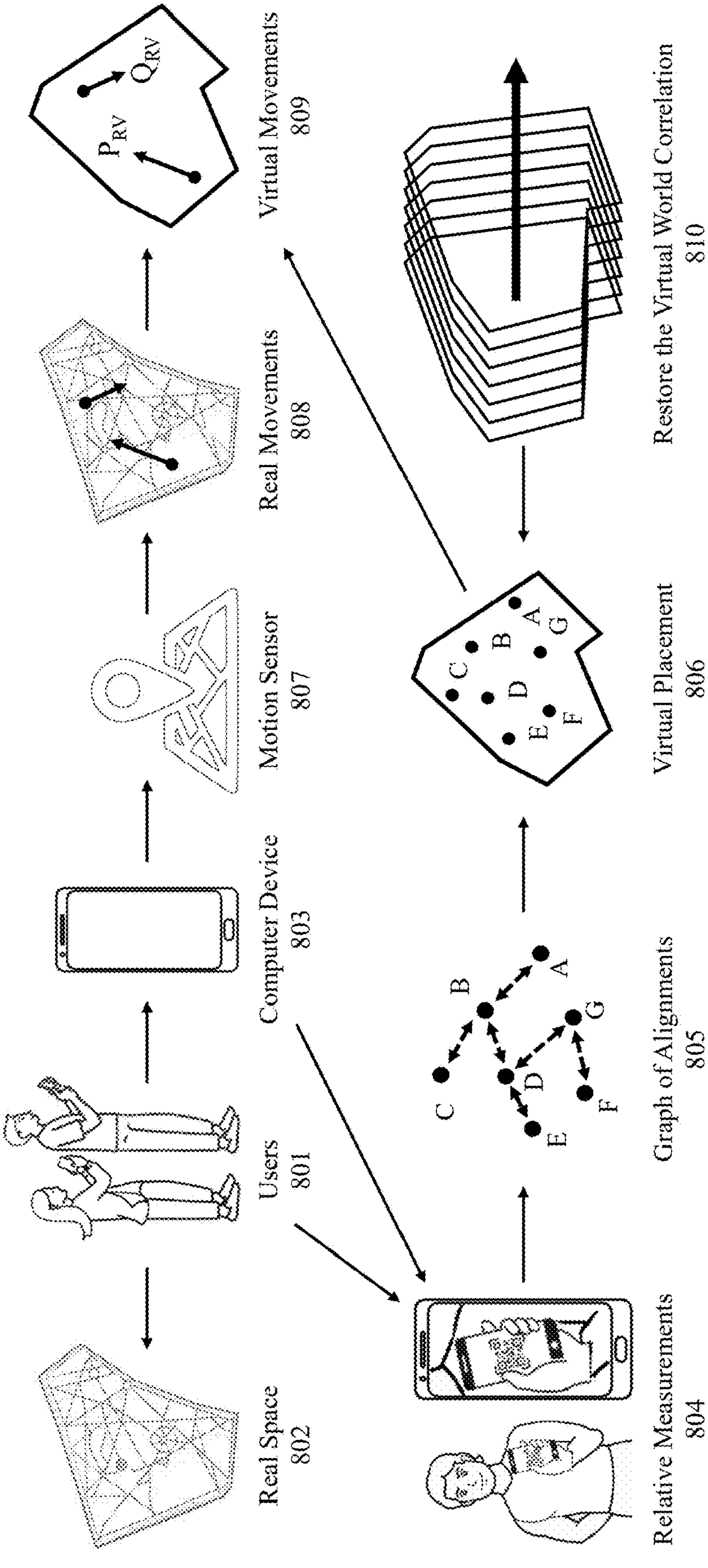
FIG. 8 shows the entire system to measure, track, and correct the alignments between multiple users in real and virtual worlds.

FIG. 8 shows the entire system to measure, track, and correct the alignments between multiple users in real and virtual worlds.

Multiple Users 801 who share a Real-World Space 802 each have a Computer Device 803 that can take Relative Measurements 804 of position and orientation between two users. All users 801 take relative measurements of each other until a Graph of Alignments 805 is formed. From this, a Virtual Placement 806 is formed of each user's relative position in a virtual world. The virtual world's own alignment into the real world could be any position and orientation, chosen by the system or by users.

Each user's Computer Device 803 has a Relative Motion Sensor 307 that can track each user's Relative Movement in the Real World 308, which is translated into Virtual Movements 309 of the user's viewpoints, and perhaps avatars, in a virtual world. Thus, each user, separately, is effectively at the "same place" (properly correlated) in the real and virtual worlds.

As desired, or to respond to correlation errors, the entire Graph of Alignments 805 can be recalculated, with the users 801 taking Relative Measurements 804 again. Or the correlation error can be healed over time by Restoring the Virtual World's Placement in the Real World 810 back towards the last known correlation, or towards some other correlation such as the centroid between the correlations.

Other Implementation Options

It should be understood that the example embodiments described above may be implemented in many different ways. In some instances, the various "data processors" may each be implemented by a physical or virtual general purpose computer having a central processor, memory, disk or other mass storage, communication interface(s), input/output (I/O) device(s), and other peripherals. The general-purpose computer is transformed into the processors and executes the processes described above, for example, by loading software instructions into the processor, and then causing execution of the instructions to carry out the functions described.

As is known in the art, such a computer may contain a system bus, where a bus is a set of hardware lines used for data transfer among the components of a computer or processing system. The bus or busses are essentially shared conduit(s) that connect different elements of the computer system. One or more central processor units are attached to the system bus and provide for the execution of computer instructions. Also attached to system bus are typically I/O device interfaces for connecting disks, memories, and various input and output devices. Network interface(s) allow connections to various other devices. One or more memories provide volatile and/or non-volatile storage for computer software instructions and data used to implement an embodiment. Disks or other mass storage provides non-volatile storage for computer software instructions and data used to implement, for example, the various procedures described herein.

Embodiments may therefore typically be implemented in hardware, custom designed semiconductor logic, Application Specific Integrated Circuits (ASICs), Field Programmable Gate Arrays (FPGAs), firmware, software, or any combination thereof.

In certain embodiments, the procedures, devices, and processes described herein are a computer program product, including a computer readable medium (e.g., a removable storage medium such as one or more DVD-ROM's, CD-ROM's, diskettes, tapes, etc.) that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transient machine-readable medium may include read only memory (ROM); random access memory (RAM); storage including magnetic disk storage media; optical storage media; flash memory devices; and others.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

The above description included an explanation of several example embodiments. It should be understood that while a particular feature may have been disclosed with respect to only one of several embodiments, that particular feature may be combined with one or more other features of the other embodiments as may be desired and advantageous for any given or particular application. It is, of course, not possible to describe every conceivable combination of components or methodologies for purposes of describing the innovations herein, and one skill in the art may now, in light of the above description, recognize that many further combinations and permutations are possible. Also, to the extent that the terms "includes," and "including" and variants thereof are used in either the detailed description or the claims, these terms are intended to be inclusive in a manner similar to the term "comprising".

It also should be understood that the block and flow diagrams may include more or fewer elements, be arranged differently, or be represented differently. The computing devices, processors, controllers, firmware, software, routines, or instructions as described herein may also perform only certain selected actions and/or functions. Therefore, it will be appreciated that any such descriptions that designate one or more such components as providing only certain functions are merely for convenience.

When a series of steps has been described above with respect to the flow diagrams, the order of the steps may be modified in other implementations. In addition, the operations and steps may be performed by additional or other modules or entities, which may be combined or separated to form other modules or entities. For example, while a series of steps has been described with regard to certain figures, the order of the steps may be modified in other implementations consistent with the principles explained herein. Further, non-dependent steps may be performed in parallel. Further, disclosed implementations may not be limited to any specific combination of hardware.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

Accordingly, the subject matter covered by this patent is intended to embrace all such alterations, modifications, equivalents, and variations that fall within the spirit and scope of the claims that follow.

The invention claimed is:

1. A computer-implemented method to provide a virtual experience for multiple users without an absolute positioning system, the method comprising:

a. obtaining, by portable electronic devices respectively associated with a plurality of users sharing a real-world space, relative measurements of real-world alignments between users, including relative positions and relative orientations, by directly sensing positions and orientations with respect to at least one other portable electronic device, without requiring absolute coordinates, GPS, or beacons;

b. forming, from the relative measurements, a graph of alignments linking the users, wherein the graph is produced from the directly sensed relative position and orientation;

c. placing user viewpoints into a shared virtual space based on the graph of alignments for each user; and d. correlating the shared virtual space into the real-world space so that user physical locations correspond to user virtual locations as mapped via that correlation.

2. The method of claim 1 additionally comprising:

a. after making an alignment, then tracking, by a relative movement sensor of each portable electronic device, the relative real-world movements of the corresponding users; and b. maintaining positions and orientations of the user viewpoints or avatars in the shared virtual space that are correlated to the tracked relative real-world movements.

3. The method of claim 1, further comprising maintaining, for each user, a separate correlation of the shared virtual space into the shared real-world space.

4. The method of claim 3, further comprising permitting the separate correlation of at least one user to change while the virtual experience continues for other users.

5. The method of claim 1, wherein obtaining the relative measurements comprises:

a. displaying, by a first portable electronic device, a detectable feature of the first portable electronic device; and b. detecting, by a second portable electronic device, the detectable feature to determine a relative position and a relative orientation of the second portable electronic device relative to the first portable electronic device.

6. The method of claim 5 wherein the detectable feature is an augmented reality anchor.

7. The method as of claim 5 wherein if a user A must rotate or move to scan more than one other user, user A's own orientation and position is tracked through a sensor to obtain the relative position and orientation.

8. The method of claim 1, wherein tracking the relative real-world movements comprises users walking through the real-world space while an augmented reality algorithm uses a mobile phone camera to track the users' relative movement.

9. The method of claim 1 wherein determining relative positions and relative orientation is for at least three users A, B, and C, where the third user C is too far for an accurate distance measurement, further comprises:

a. taking an orientation measurement between A and B;

b. taking an orientation measurement between A and C, which may require real-time orientation tracking for A to turn towards C;

c. taking a distance measurement between users A and B; and d. triangulating user C's relative position.

10. The method of claim 1 wherein determining relative positions and relative orientations is for at least two users A and B who are too far apart for a distance measurement, further comprises:

a. taking an orientation measurement between A and B;

b. user A moving to a second location, with A's relative distance and orientation tracked through some sensor;

c. from that second location, taking a second orientation measurement between A and B;

d. triangulating the relative position of A and B.

11. A computer-implemented method to provide a virtual experience for multiple users without an absolute positioning system, the method comprising:

a. obtaining, by portable electronic devices respectively associated with a plurality of users sharing a real-world space, relative measurements of real-world alignments between users, including relative positions and relative orientations, without requiring absolute coordinates, GPS, or beacons;

b. forming, from the relative measurements, a graph of alignments linking the users;

c. placing user viewpoints into a shared virtual space based on the graph of alignments for each user; and d. correlating the shared virtual space into the real-world space so that user physical locations correspond to user virtual locations as mapped via that correlation, further comprising detecting that users' relative positions become misaligned due to accumulative flaws in the relative movement sensor and/or due to a change in the correlation of the shared virtual space into the real-world space.

12. The method of claim 11, further comprising, in response to detecting that user's relative positions become misaligned, either (a) temporarily accepting an error and gradually healing differing correlations of the two or more users back toward alignment in the virtual world as the users move through the real-world space, or (ii) abruptly adjusting the different correlations of the two or more users, which may require one or more users to move to new positions in the real world.

13. A multi-user extended-reality system comprising:

a. a plurality of portable electronic devices respectively associated with a plurality of users sharing a real-world space, each portable electronic device including a relative movement sensor configured to track relative changes in position and orientation of an associated user by directly sensing positions and orientations with respect to at least one other portable electronic device, without an absolute positioning system, GPS, or beacons;

b. one or more processors configured to obtain relative measurements of real-world alignments between users to form a graph of alignments wherein the graph is produced from the directly sensed relative position and orientation;

c. one or more processors configured to place respective user viewpoints or avatars in a shared virtual space based on the graph of alignments; and d. one or more processors configured to correlate the shared virtual space into the real-world space via a correlation and, after a starting alignment, maintain positions and orientations of the user viewpoints or avatars in the shared virtual space based on tracked relative movements while using the correlation.

14. A multi-user extended-reality system comprising:

a. a plurality of portable electronic devices respectively associated with a plurality of users sharing a real-world space, each portable electronic device including a relative movement sensor configured to track relative changes in position and orientation of an associated user without an absolute positioning system, GPS, or beacons;

b. one or more processors configured to obtain relative measurements of real-world alignments between users to form a graph of alignments;

c. one or more processors configured to place respective user viewpoints or avatars in a shared virtual space based on the graph of alignments; and d. one or more processors configured to correlate the shared virtual space into the real-world space via a correlation and, after a starting alignment, maintain positions and orientations of the user viewpoints or avatars in the shared virtual space based on tracked relative movements while using the correlation, wherein, responsive to detecting misalignment due to accumulative flaws in the relative movement sensor and/or due to a change in the correlation of the shared virtual space into the real-world space, the one or more processors are configured to perform at least one of:

e. resetting alignment by taking fresh relative measurements between users;

f. temporarily accepting an error and healing differing correlations back toward alignment through a series of small, smooth movements; or g. forcing correlations back together by selecting an aligned correlation and requiring at least one user to move to a new physical location.

15. The system of claim 14, wherein the one or more processors are configured to maintain, for each user, a separate correlation of the shared virtual space into the shared real-world space, and to detect when those separate correlations have become unaligned.

* * * * *